United States Patent [19]

Chamberlain et al.

[11] Patent Number: 5,141,997
[45] Date of Patent: Aug. 25, 1992

[54] SELECTIVE HYDROGENATION OF CONJUGATED DIOLEFIN POLYMERS

[75] Inventors: Linda R. Chamberlain; Carma J. Gibler, both of Houston; Richard A. Kemp, Stafford; Stanley E. Wilson, Houston, all of Tex.

[73] Assignee: Shell Oil Company, Houston, Tex.

[21] Appl. No.: 568,113

[22] Filed: Aug. 15, 1990

[51] Int. Cl.$^5$ .................................................. C08F 8/04
[52] U.S. Cl. ............................ 525/338; 525/332.8; 525/332.9; 525/333.1; 525/333.2; 525/339
[58] Field of Search ................................ 525/338, 339

[56] References Cited

U.S. PATENT DOCUMENTS

| | | | |
|---|---|---|---|
| 2,449,949 | 9/1944 | Morris et al. | 260/74 |
| 3,113,986 | 12/1963 | Breslow et al. | 260/683.9 |
| 3,472,829 | 10/1969 | Claybaugh et al. | 260/93.7 |
| 3,475,399 | 10/1969 | Peters et al. | 260/93.7 |
| 3,525,729 | 8/1970 | Gaeth | 260/94.3 |
| 3,541,064 | 11/1970 | Yoshimoto et al. | 260/85.1 |
| 3,580,897 | 5/1971 | Yoshimoto et al. | 260/85.1 |
| 3,720,654 | 3/1973 | Olechowski | 260/85.3 R |
| 3,937,759 | 2/1976 | Baumgartner et al. | 260/879 |
| 4,014,859 | 3/1977 | Cooper et al. | 526/65 |
| 4,156,673 | 5/1979 | Eckert | 260/33.6 |
| 4,340,703 | 7/1982 | Freppel | 526/79 |
| 4,501,857 | 2/1985 | Kishimoto et al. | 525/338 |
| 4,547,555 | 10/1985 | Cook et al. | 526/60 |
| 4,629,767 | 12/1986 | Shyr et al. | 525/339 |
| 4,673,714 | 6/1987 | Kishimoto et al. | 525/314 |

FOREIGN PATENT DOCUMENTS

| | | |
|---|---|---|
| 0339986 | 11/1989 | European Pat. Off. |
| 62-209102 | 9/1987 | Japan |
| 62-209103 | 9/1987 | Japan |
| 363810 | 12/1931 | United Kingdom |

OTHER PUBLICATIONS

Ziegler-Natta Catalysts and Polymerizations, John Boor, Jr., published by Academic Press in 1979.
Journal of Organo Metallic Chemistry, Feb. 6, 1990, vol. 382, Nos. 1 and 2, pp. 69-76.

*Primary Examiner*—Bernard Lipman
*Attorney, Agent, or Firm*—Donald F. Haas

[57] ABSTRACT

This invention provides a catalyst and a process for the hydrogenation of conjugated diolefin polymers which first involves the polymerization or copolymerization of such monomers with an organo alkali metal polymerization initiator in a suitable solvent thereby creating a living polymer. The living polymer is preferably terminated by the addition of hydrogen. Finally, selective hydrogenation of the unsaturated double bonds in the conjugated diolefin units of the terminated polymer is carried out in the presence of at least one bis(cyclopentadienyl)titanium (+3) compound of the formula:

$$(C_5R''_5)_2\text{—Ti—R}$$

where R is selected from the group consisting of alkyl, aralkyl, allyl, aryl, alkoxy, halogen, silyl or amine and R", which may be the same or different, is selected from the group consisting of hydrogen, alkyl, aralkyl or aryl.

21 Claims, No Drawings

SELECTIVE HYDROGENATION OF CONJUGATED DIOLEFIN POLYMERS

BACKGROUND OF THE INVENTION

The present invention relates to a process for the production of selectively hydrogenated polymers of conjugated dienes and more particularly to such a process utilizing a titanium hydrogenation catalyst.

The hydrogenation or selective hydrogenation of conjugated diene polymers has been accomplished using any of the several hydrogenation processes known in the prior art. For example the hydrogenation has been accomplished using methods such as those taught, for example, in U.S. Pat. Nos. 3,494,942; 3,634,594; 3,670,054; 3,700,633 and Re. 27,145, the disclosure of which patents are incorporated herein by reference. These methods known in the prior art for hydrogenating polymers containing ethylenic unsaturation and for hydrogenating or selectively hydrogenating polymers containing aromatic and ethylenic unsaturation, involve the use of a suitable catalyst, particularly a catalyst or catalyst precursor comprising a Group VIII metal.

In the methods described in the foregoing patents, a catalyst is prepared by combining a Group VIII metal, particularly nickel or cobalt, compound with a suitable reducing agent such as an aluminum alkyl. Also, while aluminum alkyls are the preferred reducing agents, it is known in the prior art that alkyls and hydrides of metals of Groups I-A, II-A and III-B of the Periodic Table of the Elements are effective reducing agents, particularly lithium, magnesium and aluminum. In general, the Group VIII metal compound is combined with Group I-A, II-A or III-B metal alkyl or hydride at a concentration sufficient to provide Group I-A, II-A and/or III-B metal to Group VIII metal ratios within the range from about 0.1:1 to about 20:1, preferably from about 1:1 to about 10:1. As indicated in the foregoing patents, the hydrogenation catalyst is generally prepared by combining the Group VIII metal compound and the reducing agent in a suitable solvent or diluent at a temperature within the range from about 20° C. to about 60° C. before the catalyst is fed to the hydrogenation reactor.

In 1985, Kishimoto et al. disclosed (in U.S. Pat. No. 4,501,857) that selective hydrogenation of the unsaturated double bonds in conjugated diolefin polymers could be achieved by hydrogenating such polymers in the presence of at least one bis(cyclopentadienyl)-titanium (+4) compound and at least one hydrocarbon lithium compound wherein the hydrocarbon lithium compound can be an added compound or a living polymer having a lithium atom in the polymer chain. European patent application 0,339,986 discloses that this can be accomplished with the same titanium (+4) compounds in combination with an alkoxy lithium compound which can either be added directly or as a reaction mixture of an organo lithium compound with an alcoholic or phenolic compound. The use of these catalyst systems was said to be advantageous because the catalysts were said to be highly active so that they were effective even in such a small amount as not to affect adversely the stability of a hydrogenated polymer and require no deashing step. Further, the hydrogenation was said to be able to be carried out under mild conditions.

In U.S. Pat. No. 4,673,714, bis(cyclopentadienyl)-titanium (+4) compounds were disclosed which preferentially hydrogenate the unsaturated double bonds of conjugated diolefins but do not require the use of an alkyl lithium compound. These titanium (+4) compounds were bis(cyclopentadienyl)titanium (+4) diaryl compounds. The elimination of the need for the hydrocarbon lithium compound was said to be a significant advantage of the invention disclosed in the '714 patent.

SUMMARY OF THE INVENTION

The present invention provides a catalyst and a process for the hydrogenation of conjugated diolefin polymers, especially copolymers thereof with alkenyl aromatic hydrocarbons, which first involves the polymerization or copolymerization of such monomers with an organo alkali metal polymerization initiator in a suitable solvent thereby creating a living polymer. The living polymer is preferably terminated by the addition of hydrogen. Finally, selective hydrogenation of the unsaturated double bonds in the conjugated diolefin units of the terminated polymer is carried out in the presence of at least one bis(cyclopentadienyl) titanium (+3) compound of the formula:

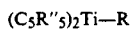

$$(C_5R''_5)_2Ti-R$$

wherein R is alkyl, aralkyl, allyl, aryl, alkoxy, halogen, silyl or amine and R" is hydrogen, alkyl, aralkyl, aryl or mixtures thereof. If the polymer is terminated with hydrogen, addition of an initiator (cocatalyst) is not required. If an alcohol is used for termination, then an initiator such as hydrocarbon alkali metal compound must be used to achieve good hydrogenation.

DETAILED DESCRIPTION OF THE INVENTION

As is well known, polymers containing both aromatic and ethylenic unsaturation can be prepared by copolymerizing one or more polyolefins, particularly a diolefin, by themselves or with one or more alkenyl aromatic hydrocarbon monomers. The copolymers may, of course, be random, tapered, block or a combination of these, as well as linear, star or radial.

As is well known, polymers containing ethylenic unsaturation or both aromatic and ethylenic unsaturation may be prepared using anionic initiators or polymerization catalysts. Such polymers may be prepared using bulk, solution or emulsion techniques. In any case, the polymer containing at least ethylenic unsaturation will, generally, be recovered as a solid such as a crumb, a powder, a pellet or the like. Polymers containing ethylenic unsaturation and polymers containing both aromatic and ethylenic unsaturation are, of course, available commercially from several suppliers.

In general, when solution anionic techniques are used, conjugated diolefin polymers and copolymers of conjugated diolefins and alkenyl aromatic hydrocarbons are prepared by contacting the monomer or monomers to be polymerized simultaneously or sequentially with an anionic polymerization initiator such as Group IA metals, their alkyls, amides, silanolates, napthalides, biphenyls and anthracenyl derivatives. It is preferred to use an organoalkali metal (such as lithium, sodium or potassium) compound in a suitable solvent at a temperature within the range from about −150° C. to about 300° C., preferably at a temperature within the range from about 0° C. to about 100° C. Particularly effective anionic polymerization initiators are organolithium compounds having the general formula:

$$R^5Li_n$$

Wherein:
R$^5$ is an aliphatic, cycloaliphatic, aromatic or alkyl-substituted aromatic hydrocarbon radical having from 1 to about 20 carbon atoms; and n is an integer of 1 to 4.

Conjugated diolefins which may be polymerized anionically include those conjugated diolefins containing from 4 to about 12 carbon atoms such as 1,3-butadiene, isoprene, piperylene, methylpentadiene, phenylbutadiene, 3,4-dimethyl-1,3-hexadiene, 4,5-diethyl-1,3-octadiene and the like. Conjugated diolefins containing from 4 to about 8 carbon atoms are preferred for use in such polymers. Alkenyl aromatic hydrocarbons which may be copolymerized include vinyl aryl compounds such as styrene, various alkyl-substituted styrenes, alkoxy-substituted styrenes, 2-vinyl pyridine, 4-vinyl pyridine, vinyl naphthalene, alkyl-substituted vinyl naphthalenes and the like.

In general, any of the solvents known in the prior art to be useful in the preparation of such polymers may be used. Suitable solvents, then, include straight- and branched-chain hydrocarbons such as pentane, hexane, heptane, octane and the like, as well as, alkyl-substituted derivatives thereof; cycloaliphatic hydrocarbons such as cyclopentane, cyclohexane, cycloheptane and the like, as well as, alkyl-substituted derivatives thereof; aromatic and alkyl-substituted derivatives thereof; aromatic and alkyl-substituted aromatic hydrocarbons such as benzene, naphthalene, toluene, xylene and the like; hydrogenated aromatic hydrocarbons such as tetralin, decalin and the like; halogenated hydrocarbons, particularly halogenated aromatic hydrocarbons, such as chlorobenzene, chlorotoluene and the like; linear and cyclic ethers such as methyl ether, methyl ethyl ether, diethyl ether, tetrahydrofuran and the like.

Conjugated diolefin polymers and conjugated diolefin-alkenyl aromatic copolymers which may be used in the present invention include those copolymers described in U.S. Pat. Nos. 3,135,716; 3,150,209; 3,496,154; 3,498,960; 4,145,298 and 4,238,202, the disclosure of which patents are herein incorporated by reference. Conjugated diolefin-alkenyl aromatic hydrocarbon copolymers which may be used in this invention also include block copolymers such as those described in U.S. Pat. Nos. 3,231,635; 3,265,765 and 3,322,856, the disclosure of which patents are also incorporated herein by reference. In general, linear and branched block copolymers which may be used in the present invention include those which may be represented by the general formula:

$$A_z-(B-A)_y-B_x$$

Wherein:
A is a linear or branched polymeric block comprising predominantly monoalkenyl aromatic hydrocarbon monomer units;
B is a linear or branched polymeric block containing predominantly conjugated diolefin monomer units;
x and z are, independently, a number equal to 0 or 1;
y is a whole number ranging from 0 to about 15, and the sum of $x+z+y \geq 2$.

Polymers which may be treated in accordance with this invention also include coupled and radial block copolymers such as those described in U.S. Pat. Nos. 4,033,888; 4,077,893; 4,141,847; 4,391,949 and 4,444,953, the disclosure of which patents are also incorporated herein by reference. Coupled and radial block copolymers which may be treated in accordance with the present invention include those which may be represented by the general formula:

$$[B_x-(A-B)_y-A_z]_n-C-P_{n'}$$

Wherein:
A, B, x, y and z are as previously defined; n and n' are, independently, numbers from 1 to about 100 such that $n+n' \geq 3$;
C is the core of the coupled or radial polymer formed with a polyfunctional coupling agent; and
Each P is the same or a different polymer block or polymer segment having the general formula:

$$B'_{x'}-(A'-B'')_{y'}-A''_{z'}$$

Wherein:
A'' is a polymer block containing predominantly monoalkenyl aromatic hydrocarbon monomer units;
B' is a polymer block containing predominantly conjugated diolefin monomer units;
A'—B'' is a polymer block containing monoalkenyl aromatic hydrocarbon monomer units (A') and conjugated diolefin monomer units (B''), the A'—B'' monomer units may be random, tapered or block and when A'—B'' is block, the A' block may be the same or different from A'' and B'' may be the same or different from B';
x' and z' are, independently, numbers equal to 0 or 1; and
y' is a number from 0 to about 15, with the proviso that the sum of $x'+y'+z \geq 1$.

The radial polymers may, then, be symmetric or asymmetric.

In the production of all of the polymers described above, the polymerization is preferably terminated by utilizing hydrogen, deuterium or a compound which releases hydrogen upon decomposition but the conventional alcohol terminating agent may also be used. The living polymer, or more accurately, the living end of the polymer chain, is terminated by the addition of hydrogen thereto. The theoretical termination reaction is shown using an S—B—S block copolymer for exemplary purposes:

$$S-B-S^-Li^+ + H_2 \rightarrow S-B-SH + LiH$$

As shown above, it is theorized that lithium hydride is formed during the termination process. Formed in this manner, it is not a reactive polymerization initiator. It is inert to polymerization and does not interfere with the molecular weight control of the next polymerization batch as alcohol can.

It is usually advisable to contact and vigorously mix the gas with the polymerization solution at the end of the polymerization reaction. This contact and vigorous mixing can be effected by adding the hydrogen gas through spargers in a mixing vessel containing polymer solution. The time of contact should be at least about ten seconds and preferably about twenty minutes to allow sufficient contact time for the reaction to occur.

This is dependent upon the efficiency of the gas contacting equipment, gas solubility, solution viscosity and temperature. Alternatively, a continuous system could be employed whereby hydrogen is pumped into a solution prior to going to a statically mixed plug flow reactor. Hydrogen could also be dissolved in an appropriate solvent and added to the polymer solution to be terminated. Another method would be to cause the hydrogen to be absorbed into an absorption bed and then cause the polymer solution to flow through the absorption bed. The hydrogen contact could also be carried out by adding a material which gives off hydrogen upon decomposition, i.e. diimide.

When this improvement is used, the problems of using alcohol, i.e. the formation of lithium alkoxides and excess alcohol impurities, are avoided. Furthermore, this process has been found to have significant advantage if the polymer made is to be hydrogenated. It has been found that if the hydrogen method is used, the bis(cyclopentadienyl) titanium (+3) metal hydrogenation catalysts may be used without the necessity of a hydrocarbon lithium or alkoxy lithium promoter, whether added with the catalyst or present in the living polymer. Conventional alcohol termination may be used but then a catalyst promoter is required. The promoters which may be used include hydrocarbon lithium compounds of general formula LiR$^6$, where R$^6$ denotes an alkyl or aryl group of one to twenty carbon atoms. For example, methyl lithium, ethyl lithium, propyl lithium, butyl lithium, sec-butyllithium, hexyl lithium, phenyl lithium, benzyl lithium and the like, could be used as a promoter for the bis(cyclopentadienyl)-titanium (+3) catalysts. Also, organic aluminum compounds, organic zinc compounds and organic magnesium compounds may be used.

As stated above, the hydrogenation step of the present process is carried out in the presence of a bis(cyclopentadienyl) titanium (+3) metal compound of the formula:

$$(C_5R''_5)_2Ti\text{—}R \qquad (I)$$

where R'' may be the same or different, and may be hydrogen, alkyl, aralkyl, or aryl, and R is alkyl, aralkyl, allyl, aryl, alkoxy, halogen, silyl or amine.

An example of a titanium (+3) allyl compound is the following wherein R in formula (I) is represented as:

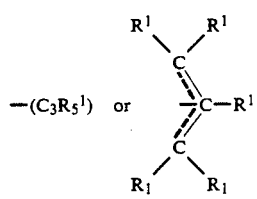

(II)

where R$^1$ may be the same or different and may be hydrogen, alkyl, aralkyl, aryl, alkoxy, halogen or silyl. The preferred allyl compound is the one in the above formulae where R$^1$ is hydrogen because it is relatively easy to prepare.

Many aralkyl compounds can be used to advantage in the present invention. One preferred class is compounds wherein R in formula (I) is represented by:

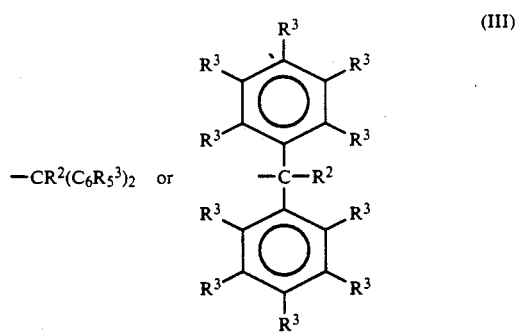

(III)

where the definitions of R$^2$ and R$^3$ are the same as that of R$^1$. The preferred compound of this type is benzhydryl wherein R$^2$ and R$^3$ are hydrogen.

Aryl compounds are also useful herein. A preferred class is represented by the following formula wherein R in formula (I) is represented by:

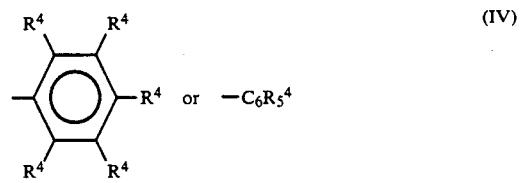

(IV)

where R$^4$ has the same definition as R$^1$, R$^2$ and R$^3$. The preferred compound of this class is mesityl (2,4,6-trimethylbenzene).

This process will selectively hydrogenate conjugated diolefins without hydrogenating alkenyl aromatic hydrocarbons to any degree. Hydrogenation percentages of greater than 50% are easily obtained but it has been found that in order to achieve hydrogenation percentages of greater than 95% as is often desired, the alkali metal (for example, lithium) to titanium (+3) ratio should be at least about 2:1 and preferably is from about 3 to 30 when no promoter is used. There has to be sufficient alkali metal to ensure quick and sufficient interaction between the two metals. A high viscosity (high molecular weight) polymer may require a higher ratio because of the lesser mobility of the metals in the polymer cement. If alkali metal hydride must be added to increase the ratio, it can be made in situ by adding an organo alkali metal compound and hydrogen to the polymer (i.e., sparge), either before or after termination of the polymerization.

In general, the hydrogenation is carried out in a suitable solvent at a temperature within the range of from about 0° to about 120° C., preferably about 70° to about 90° C., and at a hydrogen partial pressure within the range from about 1 psig to about 1200 psig, preferably from about 300 to about 800 psig. Catalyst concentrations within the range from about 0.01 mM(millimoles) per 100 grams of polymer to about 20 mM per 100 grams of polymer, preferably 0.2 to 0.5 mM catalyst per 100 grams of polymer, are generally used and contacting at hydrogenation conditions is generally continued for a period of time within the range from about 30 to about 360 minutes. Suitable solvents for hydrogenation include, among others, n-heptane, n-pentane, tetrahydrofuran, cyclohexane, toluene, hexane, diethyl ether and benzene. Because of the small amount of catalyst present in the polymer after hydrogenation, it is not necessary to separate the hydrogenation catalyst and catalyst residue from the polymer. However, if separation is desired, it may be carried out using methods well known in the prior art. The hydrogenation reactions may be carried out in a batch process, or a semi-continuous process or a continuous process.

The catalysts of the present invention are prepared by using methods well known in the prior art. Generally they are prepared by reacting a bis(cyclopentadienyl)-titanium dihalide with either appropriate Grignard reagents or appropriate alkyl lithium salts. The catalysts are isolated and redissolved in solvents consistent with that of the hydrogenation process prior to the hydrogenation reaction.

EXAMPLES

Preparation of Bis(cyclopentadienyl)titanium (+3) allyl

Bis(cyclopentadienyl)titanium dichloride (5 grams) was dissolved in 200 mL of anhydrous toluene. The solution was kept at room temperature. To this was added dropwise 7.3 grams of $Mg(C_3H_5)Br$ over 30 minutes. After 24 hours of stirring, the deep purple solution was filtered and the compound was isolated by vacuum removal of the solvent. For further purification, the purple solid remaining was recrystallized from anhydrous hexane. ESR (Electron Spin Resonance) analysis of the material showed a single species with g-value of 1.993, which is consistent with literature values for compounds of this type. Elemental analysis gave consistent experimental values for carbon, hydrogen and titanium when compared to calculated values. Therefore, the catalyst was pure and homogeneous in nature.

Preparation of Bis(cyclopentadienyl)titanium (+3) benzhydryl

Bis(cyclopentadienyl)titanium dichloride (6 grams) was dissolved in 200 mL of anhydrous toluene. The solution was cooled to 0° C. To this was added dropwise 12.6 grams of $LiCH(C_6H_5)_2$ dissolved in 150 mL anhydrous ether, over a period of 30 minutes. The reaction pot was left to stir for 2 hours. The solution was then filtered to remove LiCl and the final product was isolated from the filtrate by vacuum removal of the solvent. ESR analysis of the compound showed a single species with g-value of 1.996, which is consistent with literature values for compounds of this type. Elemental analysis gave consistent experimental values for carbon, hydrogen, and titanium when compared to calculated values. Therefore, the catalyst was pure and homogeneous in nature.

Preparation of Bis(cyclopentadienyl)mesityl titanium (+3)

Bis(cyclopentadienyl)titanium dichloride (2.5 grams) was dissolved in 200 mL of anhydrous toluene. The solution was cooled to 0° C. To this was added dropwise over a 30 minute time period, 2.8 grams of $LiC_6H_3(CH_3)_3$ dissolved in 100 mL anhydrous ether. The reaction was left to stir for 2 hours. The solution was then filtered to remove LiCl and the final product was isolated from the filtrate by vacuum removal of the solvent. ESR analysis of the compound showed a single species with g-value of 1.996, which is consistent with literature values for compounds of this type. Elemental analysis gave consistent experimental values for carbon, hydrogen, and titanium when compared to calculated values. Therefore, the catalyst was pure and homogeneous in nature.

Methanol Terminated Polymer Solution

EXAMPLE 1

A 600 lb. batch of polystyrene-polybutadiene-polystyrene (S—B—S—Li+) block copolymer 50,000 molecular weight was made by anionic polymerization using sec-butyl lithium as the initiator, in a 150 gallon pressurized reactor. The polymerization took place in a mixture of cyclohexane and diethyl ether at 60° C. for 3 hours. At the end of the polymerization reaction, methanol was added to terminate the polymerization. The resulting polymer solution contained 20% by weight.

All hydrogenation runs were carried out under similar conditions unless otherwise noted. A typical hydrogenation run consisted of pressure transferring to a 4-liter reactor a 20% by weight polymer solution. The polymer solution was then diluted with cyclohexane to produce a solution containing 5% to 15% by weight polymer. The temperature of the reactor was maintained at 40° C. The polymer solution was then sparged with hydrogen gas for 20 minutes, during which time the pressure of hydrogen gas within the reactor reached 70 psig. The reactor was then vented. Sec-butyl lithium as a cocatalyst was added to the polymer solution and stirred for 10 minutes. At this point catalyst (titanium +3 based) was added to the reactor as a toluene or cyclohexane solution. After addition of the catalyst, the reactor was heated to 80° C. and pressurized to 500–700 psig with hydrogen gas. The reaction was allowed to run for 3 hours, during which time samples were drawn from the reactor and analyzed by proton NMR to determine percent conversion of olefin. Gel permeation chromatography was done on the final samples to determine molecular architecture. It was found that only the olefin segments of the polymer were hydrogenated and that the aromatic rings of the polystyrene blocks were totally unaffected by this process.

EXAMPLES 2–4

Hydrogenation of Methanol Terminated Polymer Solution With Titanium (+3) Based Catalysts A polystyrene-polybutadiene-polystyrene type block copolymer of 50,000 molecular weight was prepared as in Example 1. The polymer solution was 5% by weight polymer. The polymer was hydrogenated following the procedure described previously, i.e. at 80° C. and 500 psig hydrogen, with approximately 3 mM (millimoles) of titanium (+3) per 100 g of polymer. Table 1 is a summation of the results of these hydrogenation runs. All three titanium (+3) catalysts sufficiently hydrogenated the olefin segment of the block copolymer.

TABLE 1

| Example | Ti mM per 100 g polymer | Li:Ti ratio (Li added as Cocatalyst) | Olefin Conversion |
|---|---|---|---|
| 2 $(C_5H_5)_2Ti(C_3H_5)$ | 3.2 | 5:1 | 98% |
| 3 $(C_5H_5)_2TiCH(C_6H_5)_2$ | 3.8 | 5:1 | 98% |
| 4 $(C_5H_5)_2TiC_6H_2(CH_3)_3$ | 3.8 | 5:1 | 98% |

EXAMPLES 5-10

Hydrogenation of Methanol Terminated Polymer With Varying Amounts of Catalyst A polystyrene-polybutadiene-polystyrene block copolymer of 50,000 molecular weight was prepared as in Example 1. The polymer solution was 5% by weight polymer. The polymer was hydrogenated at 80° C. and 700 psig hydrogen with varying amounts of bis(cyclopentadienyl)titanium (+3) allyl, $Cp_2Ti(C_3H_5)$ and in some cases varying amounts of cocatalyst.

| Example | Ti mM per 100 g polymer | Li:Ti ratio (Li added as Cocatalyst) | Olefin Conversion |
|---|---|---|---|
| 5 | 3.2 | 3:1 | 98% |
| 6 | 1.1 | 3:1 | 98% |
| 7 | 0.7 | 14:1 | 98% |
| 8 | 0.4 | 5:1 | 99% |
| 9 | 0.2 | 10:1 | 87% |
| 10 | 0.4 | — | 0% |

It is apparent from these results that with higher loadings of catalyst the hydrogenation proceeds very efficiently. When the catalyst loading reaches a low level, however, the effectiveness of the hydrogenation is hindered. Li:Ti ratios do not appear to have a major role in determining the extent of hydrogenation when using bis(cyclopentadienyl) titanium allyl catalyst. With addition of no cocatalyst to the methanol terminated polymer solution as in example 10, no hydrogenation occurs.

Hydrogen Terminated Polymer Solution

EXAMPLE 11

A 600 lb. batch of polystyrene-polybutadiene-polystyrene (S—B—S—Li+) block copolymer 50,000 molecular weight was made by anionic polymerization using sec-butyl lithium as the initiator in a 150 gallon pressure reactor. The polymerization took place in a mixture of cyclohexane and diethyl ether at 60° C. for 3 hours. At the end of the polymerization reaction, the reactor temperature was approximately 60° C. The reactor was sparged with hydrogen for approximately 15 minutes. A colorimeter was used to determine when the termination was complete since S—B—S—Li+ has a distinct orange color with an absorption maximum at 328 mµ. The solution will turn colorless when the living ends are terminated. The colorimeter reading still showed "color" after 15 minutes of sparge time. At that time, the sparge vent was closed and the reactor pressurized up to 80 psig with hydrogen. The temperature was raised to 67° C. to decrease viscosity and improve mass transfer. The solution was mixed for 20 more minutes. During that time, the colorimeter reading dropped to baseline which reflected a terminated polystyrene-polybutadiene-polystyrene (S—B—S) polymer. The resulting solution was 20% by weight as polymer.

EXAMPLE 12

Hydrogenation of Hydrogen Terminated Polymer Solution

A polystyrene-polybutadiene-polystyrene type block copolymer of 50,000 molecular weight was prepared as in Example 11. The 20% by weight polymer solution was diluted with cyclohexane to a 15% by weight polymer solution. No cocatslyst was added to the reactor. The polymer solution was sparged with hydrogen for 20 minutes. The contents of the reactor were heated to 80° C. Bis(cyclopentadienyl)titanium (+3) allyl dissolved in 50 ml toluene was added to the reactor. After catalyst addition, the reactor was pressurized with hydrogen gas to 700 psig. The hydrogenation was allowed to proceed for 3 hours. Table 2 compares the results of this run with those of a run performed under the same conditions with methanol terminated polymer solution in which sec-butyl lithium had been added as a cocatalyst (Example 9 from above) and shows that the $H_2$ termination helps achieve higher hydrogenation conversion.

TABLE 2

| Example | Ti mM per 100 g polymer | Li:Ti ratio (Li added as Cocatalyst) | Olefin Conversion |
|---|---|---|---|
| 12 | 0.2 | 0 | 98% |
| 9 | 0.2 | 10:1 | 87% |

EXAMPLES 13-15

Hydrogenation of Hydrogen Terminated Feed With the Addition of a Cocatalyst

A 15% by weight solution of a polystyrene-polybutadiene-polystyrene type block copolymer of 50,000 molecular weight was prepared as in Example 11. The polymer solution was heated to 40° C., pressurized with hydrogen gas to 70 psig and allowed to stir for 20 minutes. The reactor was depressurized and sec-butyl lithium was added and stirred into the polymer solution for 10 minutes. The contents of the reactor were then heated to 80° C. Bis(cyclopentadienyl)-titanium (+3) allyl, dissolved in toluene, was added to the reactor. After catalyst addition, the hydrogen pressure within the reactor was raised to 700 psig. The hydrogenation reactor proceeded for 3 hours. Table 3 summarizes the results of these runs. It is apparent that the addition of sec-butyl lithium to polymer solution that has been terminated with hydrogen gas hinders the extent of hydrogenation the polymer undergoes because Examples 13-15, where a promoter was used, produced less olefin conversion than Example 12 where no promoter was used.

TABLE 3

| Example | Ti mM per 100 g polymer | Li:Ti ratio (Li added as Cocatalyst) | Olefin Conversion |
|---|---|---|---|
| 13 | 0.2 | 5:1 | 58% |
| 14 | 0.2 | 10:1 | 34% |
| 15 | 0.1 | 20:1 | 20% |
| 12 | 0.2 | 0 | 98% |

EXAMPLES 16-19

Hydrogenation of Hydrogen Terminated Polymer

A 20% by weight solution of polystyrene-polybutadiene-polystyrene type block copolymer of 50,000 molecular weight was prepared as in Example 11. The polymer was hydrogenated as in Example 11. Table 4 highlights the results of these runs and expresses the consistent nature of the hydrogenation catalyst with a different polymer.

TABLE 4

| Example | Ti mM per 100 g polymer | No Addition of Li | Olefin Conversion |
| --- | --- | --- | --- |
| 16 | 0.2 | 0 | 97% |
| 17 | 0.2 | 0 | 98% |
| 18 | 0.2 | 0 | 98% |
| 19 | 0.2 | 0 | 97% |

We claim:

1. A process for the selective hydrogenation of the unsaturated double bonds in the conjugated diolefin units of polymers containing said diolefin units, said process comprising hydrogenating said polymers in the presence of hydrogen and a catalyst comprising an alkali metal promoter and a bis(cyclopentadienyl)-titanium (+3) compound of the formula:

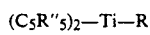

where R is selected from the group consisting of alkyl, aralkyl, allyl, aryl, alkoxy, halogen, silyl or amine and R", which may be the same or different, is selected from the group consisting of hydrogen, alkyl, aralkyl and aryl.

2. The process of claim 1 wherein R is an allyl compound of the formula:

where $R^1$, which may be the same or different, is selected from the group consisting of hydrogen, alkyl, aralkyl, aryl, alkoxy, halogen and silyl.

3. The process of claim 2 wherein $R^1$ and R" are hydrogen.

4. The process of claim 1 wherein R is of the formula:

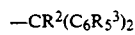

where $R^2$ and $R^3$, which may be the same or different, are selected from the group consisting of hydrogen, alkyl, aralkyl, aryl, alkoxy, halogen and silyl.

5. The process of claim 4 wherein $R^2$, $R^3$ and R" are hydrogen.

6. The process of claim 1 wherein R is of the formula:

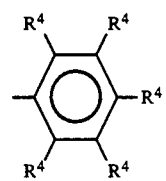

wherein $R^4$, which may be the same or different, is selected from the group consisting of hydrogen, alkyl, aralkyl, aryl, alkoxy, halogen and silyl.

7. The process of claim 6 wherein R" is hydrogen and R is

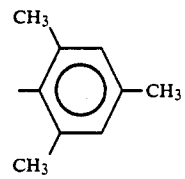

8. A process for the hydrogenation of conjugated diolefin polymers which comprises:
    (a) polymerizing or copolymerizing at least one conjugated diolefin with an organo-alkali metal polymerization initiator in a suitable solvent thereby creating a living polymer,
    (b) terminating the polymerization by the addition of hydrogen, deuterium or a compound that releases hydrogen upon decomposition, and
    (c) effecting selective hydrogenation of the unsaturated double bonds in the conjugated diolefin units of said terminated polymer by contacting the polymer with hydrogen in the presence of a bis(cyclopentadienyl)titanium (+3) compound of the formula:

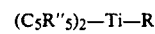

where R is selected from the group consisting of alkyl, aralkyl, allyl, aryl, alkoxy, halogen, silyl or amine and R", which may be the same or different, is selected from the group consisting of hydrogen, allyl, aralkyl and aryl.

9. The process of claim 8 wherein R is an allyl compound of the formula:

where $R_1$, which may be the same or different, is selected from the group consisting of hydrogen, alkyl, aralkyl, aryl, alkoxy, halogen and silyl.

10. The process of claim 9 wherein $R^1$ and R" are hydrogen.

11. The process of claim 8 wherein R is of the formula:

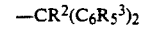

where $R^2$ and $R^3$, which may be the same or different, are selected from the group consisting of hydrogen, alkyl, aralkyl, aryl, alkoxy, halogen and silyl.

12. The process of claim 11 wherein $R^2$, $R^3$ and R" are hydrogen.

13. The process of claim 8 wherein R is of the formula:

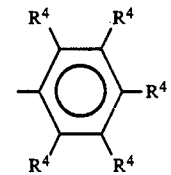

wherein $R^4$, which may be the same or different, is selected from the group consisting of hydrogen, alkyl, aralkyl, aryl, alkoxy, halogen and silyl.

14. The process of claim 13 wherein R" is hydrogen and R is

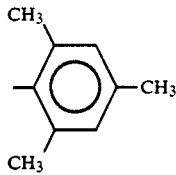

15. The process of claim 1 or 8 wherein a diolefin is copolymerized with at least one alkenyl aromatic hydrocarbon.

16. The process of claim 15 wherein the diolefin is selected from the group consisting of butadiene and isoprene and the alkenyl aromatic hydrocarbon is styrene.

17. The process of claim 1 or 8 wherein the diolefin is selected from the group consisting of butadiene and isoprene.

18. The process of claim 1 wherein the hydrogenation is carried out at a temperature from about 0° C. to about 120° C. and a pressure of from about 1 psig to about 1200 psig and the catalyst concentration is from about 0.01 mM to about 20 mM of titanium (+3) per 100 g of polymer and the contacting takes place for a period of time within the range from about 30 to about 360 minutes.

19. The process of claim 18 wherein the hydrogenation is carried out at a temperature from about 70° to about 90° C. and a pressure from about 300 to about 800 psig and the catalyst concentration is about 0.2 to about 0.5 mM catalyst per 100 g of polymer.

20. The process of claim 1 wherein the promoter is an organolithium compound.

21. The process of claim 20 wherein the promoter is sec-butyl lithium.

* * * * *